(12) United States Patent
Izumikawa

(10) Patent No.: US 10,293,751 B2
(45) Date of Patent: May 21, 2019

(54) PERIPHERAL IMAGE DISPLAY DEVICE AND METHOD OF DISPLAYING PERIPHERAL IMAGE FOR CONSTRUCTION MACHINE

(71) Applicant: SUMITOMO (S.H.I.) CONSTRUCTION MACHINERY CO., LTD., Tokyo (JP)

(72) Inventor: Takeya Izumikawa, Chiba (JP)

(73) Assignee: SUMITOMO (S.H.I.) CONSTRUCTION MACHINERY CO., LTD., Tokyo (JP)

(*) Notice: Subject to any disclaimer, the term of this patent is extended or adjusted under 35 U.S.C. 154(b) by 0 days.

(21) Appl. No.: 16/013,172

(22) Filed: Jun. 20, 2018

(65) Prior Publication Data

US 2018/0297524 A1  Oct. 18, 2018

Related U.S. Application Data

(63) Continuation of application No. 14/289,800, filed on May 29, 2014, now Pat. No. 10,017,113, which is a
(Continued)

(30) Foreign Application Priority Data

Dec. 13, 2011 (JP) .................................. 2011-272741

(51) Int. Cl.
*B60R 1/00* (2006.01)
*H04N 7/18* (2006.01)
(Continued)

(52) U.S. Cl.
CPC ............... *B60R 1/00* (2013.01); *H04N 7/181* (2013.01); *B60R 2300/105* (2013.01);
(Continued)

(58) Field of Classification Search
CPC ............... B60R 1/00; B60R 2300/202; B60R 2300/802
(Continued)

(56) References Cited

U.S. PATENT DOCUMENTS

2011/0044505 A1  2/2011  Lim et al.
2013/0033493 A1  2/2013  Kiyota
(Continued)

FOREIGN PATENT DOCUMENTS

EP         2003018          12/2008
JP      2001295321 A   *  10/2001
(Continued)

OTHER PUBLICATIONS

International Search Report for PCT/JP2012/081422 dated Mar. 19, 2013.

*Primary Examiner* — Jeffery A Williams
(74) *Attorney, Agent, or Firm* — IPUSA, PLLC

(57) ABSTRACT

A peripheral image display device for displaying a peripheral image around a construction machine including at least two imaging units capturing the peripheral image around the construction machine; an image combining unit that combines at least two images obtained from the at least two imaging units to form a single projection image, the at least two images including an overlapping area overlapping between the at least two images; a guideline setting unit that sets a guideline, which includes at least two color information pieces, on the projection image formed by the image combining unit at a position a predetermined distance apart from the construction machine; a guideline generating unit that generates the guideline on the projection image based on setup information obtained by the guideline setting unit;
(Continued)

and a display unit that displays the projection image having the guideline generated by the guideline generating unit on a screen.

5 Claims, 8 Drawing Sheets

Related U.S. Application Data continuation of application No. PCT/JP2012/081422, filed on Dec. 4, 2012.

(51) Int. Cl.
  *E02F 9/24* (2006.01)
  *E02F 9/26* (2006.01)
(52) U.S. Cl.
  CPC ... *B60R 2300/202* (2013.01); *B60R 2300/304* (2013.01); *B60R 2300/802* (2013.01); *B60R 2300/8093* (2013.01); *E02F 9/24* (2013.01); *E02F 9/261* (2013.01)

(58) Field of Classification Search
  USPC .......................................... 348/148
  See application file for complete search history.

(56) References Cited

U.S. PATENT DOCUMENTS

2013/0182066 A1 7/2013 Ishimoto
2013/0259624 A1 10/2013 Manabe

FOREIGN PATENT DOCUMENTS

| | | |
|---|---|---|
| JP | 2005-188160 | 7/2005 |
| JP | 2009197456 A * | 9/2009 |
| JP | 2010-018102 | 1/2010 |
| JP | 2010-076765 | 4/2010 |
| JP | 2011-028729 | 2/2011 |
| WO | 2011/013813 | 2/2011 |

* cited by examiner

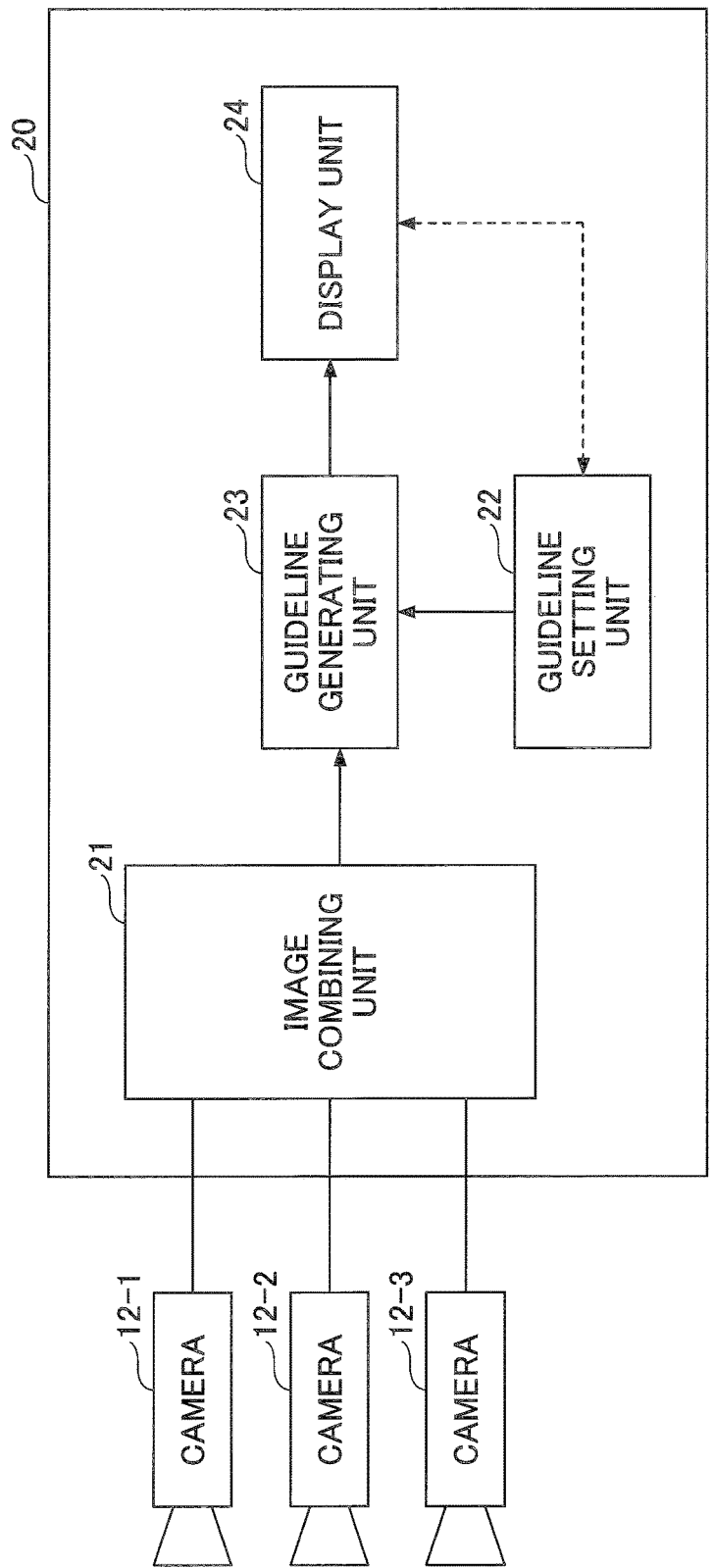

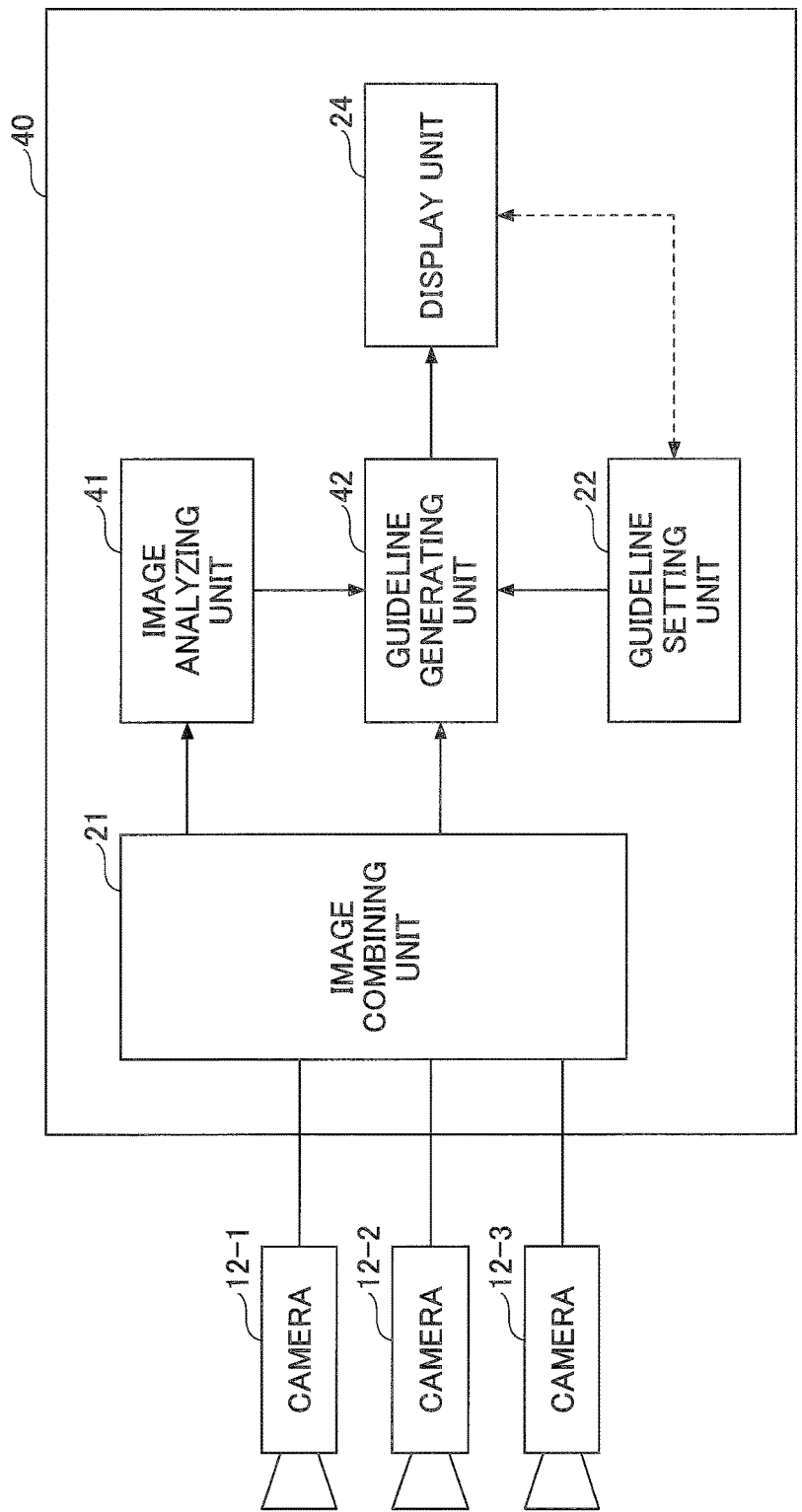

PERIPHERAL IMAGE DISPLAY DEVICE AND METHOD OF DISPLAYING PERIPHERAL IMAGE FOR CONSTRUCTION MACHINE

RELATED APPLICATION

This application is a continuation application of and is claiming benefit of priority under 35 U.S.C. 120 of U.S. patent application Ser. No. 14/289,800 filed on May 29, 2014, which is a continuation application of and is claiming benefit under 35 U.S.C. 120 and 365(c) of PCT International Patent Application No. PCT/JP2012/081422 filed on Dec. 4, 2012 and designating the U.S., which claims priority to Japanese Patent Application No. 2011-272741 filed on Dec. 13, 2011. The entire content of the foregoing applications are incorporated herein by reference.

BACKGROUND

Technical Field

The present invention relates to a peripheral image display device and a method of displaying a peripheral image for a construction machine, more specifically, a peripheral image display device and a method of displaying a peripheral image for a construction machine enabling a guideline, which is displayed together with a peripheral image, to be easily recognized in the peripheral image even if the construction machine exists in any circumstance.

Description of Related Art

An example of a construction machine such as a hydraulic shovel is greater in size than an ordinary automobile and has a specific shape. Therefore, a blind spot is apt to be produced around the construction machine. Therefore, if there is a worker who guides the construction machine or manages the work and if there is an obstacle such as a tree or a wall in a worksite, it is necessary to ensure a wider field of view.

Therefore, in the above example, a camera is installed to view a back side view image, which is not easily observed directly from a cockpit of a construction machine, and the back side view image captured by the camera is displayed on a monitor in the cockpit in order to widen the field of view in a periphery of the construction machine.

Here, a scale (a guideline) as a line of displaying a distance is set to be displayed so that the scale overlaps an image from the camera on a monitor screen. The scale is a circular line around a rotational center of an upper-part swivelling body of the construction machine, in which the camera is installed.

SUMMARY

According to an embodiment of the present invention, there is provided a peripheral image display device for displaying a peripheral image that is an image around a construction machine and is captured by at least one imaging unit including a guideline setting unit that sets a guideline, which includes at least two color information pieces, on the peripheral image captured by the imaging unit at a position a predetermined distance apart from the construction machine; a guideline generating unit that generates the guideline on the peripheral image captured by the imaging unit based on setup information obtained by the guideline setting unit; and a display unit that displays the peripheral image having the guideline generated by the guideline generating unit on a screen.

BRIEF DESCRIPTION OF THE DRAWINGS

FIG. 2 illustrates one example of a peripheral image display device in a construction machine;

FIG. 5 illustrates another example of the peripheral image display device in the construction machine;

DETAILED DESCRIPTION

Figure 1A:
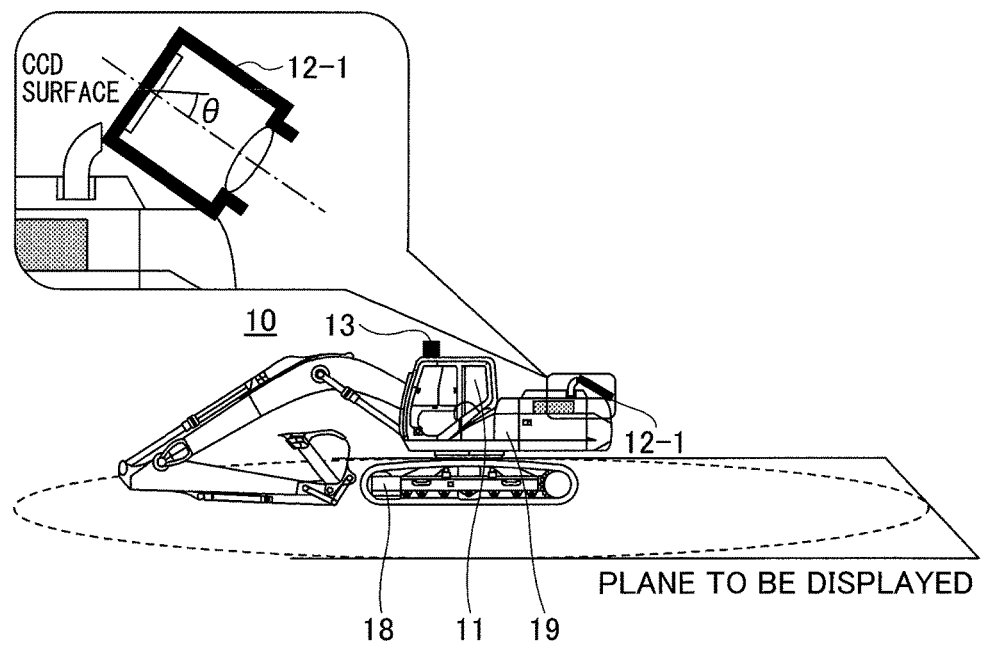
FIG. 1A illustrates an exemplary schematic structure of a construction machine.

In the above example, the guideline such as the scale displayed on the screen is displayed based on a travelling direction of the construction machine and/or a distance from the construction machine. In a case where the guideline is displayed, a monochromatic line such as white, green, red, or the like is used.

However, when the periphery of the construction machine is concrete or solar insolation is strong enough to make a camera image whitish, it is difficult to identify the guideline having a color resembling the white color. During a period of the nighttime, an entire camera image is darkened. Therefore, it is difficult to identify the guideline having a color resembling the black color on the screen. Further, in a case where a construction machine exists in a tussock, it becomes difficult to identify the guideline having a color resembling the green color. In particular, the construction machine is used in various worksites where peripheral environments are variously different. For example, reddish soil or limestone (a white color) exists in a rock quarry, and various objects are scattered in an industrial waste disposal facility. As such, because the peripheral environments of the worksite are variously different, it is necessary to cause the guideline to be easily identified even if the peripheral environments differ.

Further, a light-colored green or red may not be easily identified depending on a situation by an operator (a driver, a worker, an operator or the like) who has anomalous trichromatism.

The present invention is provided in consideration of the above problems. It is desirable to provide a peripheral image display device for a construction machine, with which a guideline displayed along with a peripheral image can be easily identified in any environment surrounding the construction machine and a method of displaying the peripheral image.

In order to achieve the above, the present invention provides a peripheral image display device for displaying a peripheral image that is an image around a construction machine and is captured by at least one imaging unit including a guideline setting unit that sets a guideline, which includes at least two color information pieces, on the peripheral image captured by the at least one imaging unit at a position a predetermined distance apart from the construction machine; a guideline generating unit that generates the guideline on the peripheral image captured by the imaging unit based on setup information obtained by the guideline setting unit; and a display unit that displays the peripheral image having the guideline generated by the guideline generating unit on a screen.

Further, the present invention provides a method of displaying a peripheral image that is an image around a construction machine and is captured by at least one imaging unit including obtaining the peripheral image that is the image around the construction machine and is captured by the at least one imaging unit; generating a guideline on the peripheral image obtained by the obtaining the peripheral image at a position a predetermined distance apart from the construction machine; and displaying the peripheral image having the guideline generated by the generating the guide line on a screen.

Further, it is effective as a mode of the present invention to apply a construction element, an expression, or an arbitrary combination of construction elements to, for example, a method, an apparatus, a system, a computer program, a recording medium, a data structure, or the like.

PRESENT INVENTION

The present invention is provided that, for example, a guideline having at least two different colors whose color information pieces are different is generated and displayed on a display screen when an image of a predetermined peripheral region of the construction machine is captured by a camera fan imaging unit) that is previously arranged at a predetermined location in, for example, a display device, which displays a peripheral image (including not only a static image but also a motion image). Here, the generated guideline may be a black and white line where a white line and a black line alternately appear.

Further, in the above exemplary construction machine, the guideline is on the image of the camera. Therefore, there is a background portion, which cannot be observed by being hidden by the guideline. Therefore, in the present invention, one color (for example, the white color) of at least two color information such as the white color and the black color that form the guideline can be displayed with a translucent white color such that the luminance of a background portion of an original image where the guideline is displayed is increased. Further, in the present invention, in a manner similar to the above white color, the luminance of a background portion of the original image where the guideline is displayed is reduced to be displayed with a translucent black color. With this, the visibility of the original image can be improved by displaying the guideline in the present invention without hiding the background image lying under the guideline. As described above, the color information to be made translucent may be one color or multiple colors.

Hereinafter, a preferred embodiment of a peripheral image display device of a construction machine and a method of displaying a peripheral image is described with reference to figures. In the following example, an example of a hydraulic shovel is exemplified as an example of the construction machine. However, the present invention is not limited to this and can be applied to various construction machineries such as a hydraulic crane, a wheel loader, a bulldozer, and a forklift.

<Schematic Structure of Construction Machine>

Figure 1B:
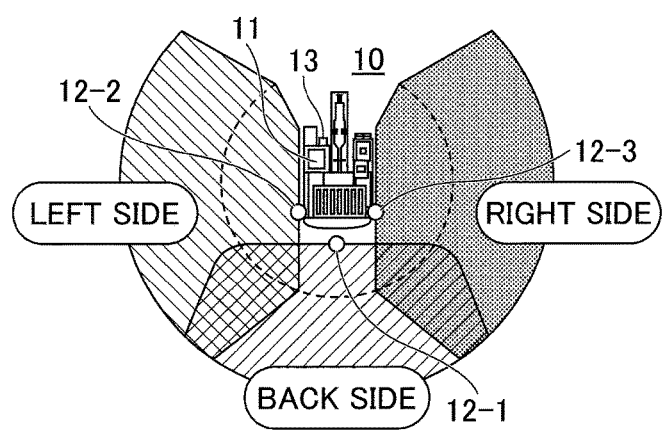
FIG. 1B illustrates another exemplary schematic structure of the construction machine.

An exemplary schematic structure of the construction machine of this embodiment is described with reference to figures. FIG. 1A illustrates an exemplary schematic structure of a shovel as a construction machine 10. The shovel includes a lower-part travelling body 18, an upper-part swiveling body 19 mounted on the lower-part travelling body 18, and at least one camera 12-1, 12-2, or 12-3 installed in the upper-part swiveling body 19. Within the embodiment, as illustrated in FIG. 1A, the at least one camera (an imaging unit) 12-1, 12-2, or 12-3 for capturing an image (including not only the static image but also the motion image) is provided to capture the peripheral region being a blind spot from a cockpit 11 of a construction machine 10, for example. Specifically, as illustrated in FIG. 1B, cameras 12-1 to 12-3 (hereinafter, generally referred to as a "camera 12" when necessary) are provided on a back side (rear) and right and left sides (side) of the construction machine 10. However, the present invention is not limited to this. For example, only one camera 12 may be provided on the back side. Further, within the embodiment, the camera may not be provided in the construction machine 10 and may be located at an external place from which the blind spot of the construction machine 10 can be captured.

The cameras 12-1 to 12-3 may be, for example, an asynchronous National Television System Committee (NTSC) color camera or the like. However, in the present invention, the cameras are not limited to the asynchronous NTSC color camera. Further, the camera 12 may perform a corresponding auto gain control to maintain a brightness uniformity to a certain level even if the brightness is changed depending on the direction of capturing the image. Further, the camera 12 may have a Charge Coupled Device (CCD) with a high sensitivity to ensure the field of view in, for example, dusk, nighttime, or the like.

Within the embodiment, images obtained from the cameras 12-1 to 12-3 are projected on a contact surface of the construction machine 10 so that the images are combined using a relationship among the installation positions of each camera 12 and the angles of view of each camera 12 as illustrated in FIG. 1B. Therefore, the cameras 12-1 to 12-3 are installed by inclining the CCD surfaces by a predetermined angle $\theta$ in the direction toward the ground as illustrated in, for example, FIG. 1A. With this, the contact surface of the construction machine 10 becomes a plane to be displayed.

Further, referring to FIG. 1B, in this embodiment, there are an image overlapping region between an image obtained by the camera 12-1 and an image obtained by the camera 12-2 and another image overlapping region between an image obtained by the camera 12-1 and an image obtained by the camera 12-3. As to the image overlapping region, a known method is used to perform an image bordering process to prevent an object (for example, an obstacle) positioned in the image overlapping regions from vanishing from the composite image.

Accordingly, within this embodiment, a peripheral circumstance of the construction machine 10 can be displayed on a peripheral image display device in the cockpit 11 with an image by which a positional relationship among the construction machine, the worker, and the obstacle are easily understood.

As a method of installing the camera 12 in, for example, the construction machine 10, there are conditions in that the camera 12 does not protrude from the construction machine 10, the posture of the camera 12 is not easily changed by vibration, impact and soon while the construction machine 10 is operated, functionality or outer appearance of the hydraulic shovel or the like is not extremely spoiled. Within the embodiment, in order to equalize views of the obstacle on the images of the cameras, the cameras are arranged to be bilaterally symmetric as much as possible, and the directions of capturing the images are set so as not to be biased.

An exemplary camera posture at a time of installing the camera 12 is described. At first, the elevation angles (an up and down swing motion) of the cameras 12-1 to 12-3 are set to be about 55° from the vertical line in order to set a range of view from a surface of a road immediately below the camera to a large obstacle. Practically, a part of the construction machine 10 is included in a lower end of the field of view. Therefore, an area of about 30 cm to about 40 cm of the road in the vicinity of the construction machine 10 is out of the range of view.

Further, the azimuth angles (a right and left swing motion) of the cameras 12-1 to 12-3 are set to be about 90° from the sides of the main body of the construction machine 10 in important consideration of a symmetry of the directions of capturing the images. The present invention is not limited to the above. In a case where a large-sized construction machine 10 has a blind spot in front of the right or in front of the left of the construction machine 10, the cameras 12-2 and 12-3 on the sides are set to slightly face the forward direction.

Further, the rotation angles of the cameras 12-1 to 12-3 around the optical axes are constantly 0°. Within this embodiment, in the peripheral image display device, the guidelines are combined to the static images or the motion images, which are obtained by a predetermined time period or sequentially obtained from the cameras, and the combined images are displayed by, for example, a display unit such as a monitor.

Within this embodiment, an illuminance sensor (an illuminance detecting unit) that measures the periphery of the construction machine may be provided in an upper portion of the cockpit 11. Within the embodiment, by using the illuminance sensor 13, it is possible to adjust the content of the guidelines to be combined with the images captured by the cameras 12. Further, the installation positions, the numbers, and so on of the cameras 12 and the illuminance sensors 13 in the above construction machine 10 are not limited to the described above.

<Peripheral Image Display Device: Exemplary Functional Configuration>

Next, the above described peripheral image display device of the construction machine 10 is specifically explained with reference to figures.

First Example

FIG. 2 illustrates one example of a peripheral image display device in a construction machine. A display device 20 illustrated in FIG. 2 is configured to include an image combining unit 21, a guideline setting unit 22, a guideline generating unit 23, and a display unit 24.

The image combining unit 21 combines the images obtained by the cameras 12-1 to 12-3 illustrated in FIG. 1 described above. Within the embodiment, it is not limited to always combine the images obtained by the cameras 12-1 to 12-3, the images obtained by the cameras 12-1 to 12-3 can be output to a following process, or only selected two or more images may be combined. The image combining unit 21 outputs the combined images to the guideline generating unit 23.

The image combining unit 21 can acquire average luminance of the images obtained by the cameras 12-1 to 12-3 and can adjust so that unevenness does not occur among the brightness (the luminance) of the images after combining the images. Thus, within the embodiment, it is possible to produce the composite image, which can be viewed easier than before.

The guideline setting unit 22 sets the guideline to be displayed on the image obtained by the image combining unit 21. The guideline may mean a line used as a standard of a distance from the construction machine 10 or a border line between a safety zone and a danger zone. However, the present invention is not limited to this.

Therefore, the guideline setting unit 22 is provided to set the position where the above guideline is displayed. Specifically, it is possible to set a distance (for example, 5 m) from an end of a contour of the construction machine 10 or set a magnification percentage (for example, 200%) at a time of magnifying the contour shape by a similarity transformation from the center of the construction machine 10 or the center of the cockpit 11, for example.

Further, the guideline setting unit 22 sets information of a machine type of the construction machine, in which the peripheral image display device 20 is installed, if a distance where the guideline is displayed is predetermined for each machine type. Within the embodiment, for example, if the machine type is set to be A, about 1.5 m from the end of the contour of the construction machine 10 is set. Further, if the machine type is set to be B, about 3.0 m from the end of the contour of the construction machine 10 is set. A method of setting the position of the guideline is not limited to the above.

Further, the guideline setting unit 22 sets at least two colors having different color information as the colors included in the guideline, for example. The color information includes luminance (contrast, brightness of screen), color phase (hue), chroma saturation (degree of vividness), luminosity (brilliance), or the like. However, in the present invention, the color information is not limited to these.

Further, the guideline setting unit 22 sets the color information including, for example, white and black. The guideline setting unit 22 may set the guideline to be a black and white line in which at least these two colors are alternately arranged, at least these two colors are adjacently arranged beside each other, or in which at least these two colors are alternately arranged multiple times so as to be like a stripe (a stripe pattern). Within the embodiment, if the camera image is whitish (bright), the guideline can be recognized by the black line, and if the camera image is blackish (dark), the guideline can be recognized by the white line.

Therefore, within the embodiment, it is possible for the operator to easily view the guideline displayed on the screen of the display unit 24 even if the construction machine exists in any situation. Further, within the embodiment, a difference of black and white in contrast is used, instead of a difference of color from the background. Therefore, even if the operator has anomalous trichromatism, the guideline can be identified by the operator.

Within the embodiment, the guideline is not limited to the above black and white, and other two colors may be used. Further, when the above color information is set, all color information or the like which can be applied to the screen of the display unit 24 may be displayed on the screen of the display unit to enable the operator (including a driver, a worker, an operational personnel, or the like) to select the color information.

Further, the guideline setting unit 22 can set the width, the design, the width (the thickness), the length of each color of colors alternately arranged, or the like in the guideline as detailed setup information. The detailed setup information may be arbitrarily set by the operator or automatically set to be a value corresponding to screen information, which relates to a screen size, a resolution, or the like and can be acquired from the display unit 24. Then, within the embodiment, for example, the guideline is not too small or too large on the screen so that the guideline is appropriately displayed on the screen.

Various contents set by the guideline setting unit 22 are stored in a memory (a storage unit) provided inside the guideline setting unit 22. The contents set by the guideline setting unit 22 may be performed before or after an actual operation of the construction machine 10 and may be set during an operation of the construction machine 10.

The guideline generating unit 23 generates the guideline based on the contents set by the guideline setting unit 22. Specifically, the guideline generating unit 23 generates the guideline indicative of a certain distance or a border between a safety zone and a danger zone. Further, the guideline generating unit 23 combines the generated guideline with the image obtained by the image combining unit 21, and outputs the image combined with the guideline to the display unit 24.

Further, the guideline generating unit 23 can adjust the width of the guideline and/or the length of each color of the colors alternately arranged in the guide line based on the setup information acquired by the guideline setting unit 22.

The display unit 24 displays an image generated by the guideline generating unit 23. Further, when the guideline setting unit 22 requires an acquisition request for the screen information such as the screen size or the resolution of the screen, the display unit 24 outputs corresponding information to the guideline setting unit 22. The display unit 24 is, for example, a LCD color monitor. However, the display monitor is not limited to this in the present invention.

<Procedure of Displaying Peripheral Image>

Figure 3:
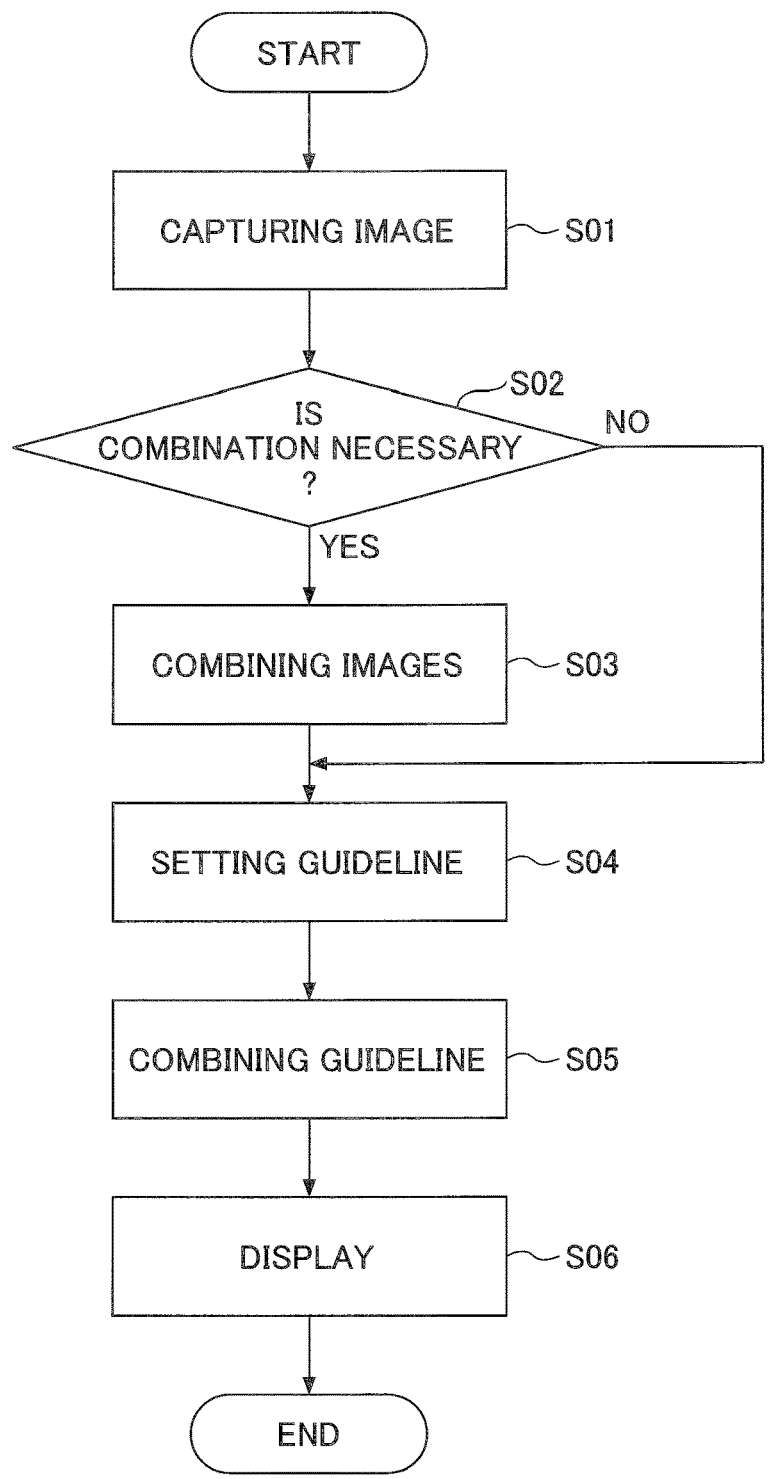
FIG. 3 is a flowchart of an exemplary process of displaying a peripheral image of the example of the peripheral image display device.

A procedure of displaying the peripheral image of the embodiment is described using a flowchart. FIG. 3 is a flowchart of an exemplary procedure of displaying the peripheral image of the embodiment. In the example of FIG. 3, various information is previously set by the guideline setting unit 22.

A peripheral image display process illustrated in FIG. 3 acquires a peripheral image of the construction machine 10 from the camera provided in the construction machine 10 (S01), and determines whether the acquired image is combined (S02).

Within the embodiment, when the number of the camera 12 is one, it is unnecessary to combine the images. Even when the number of the cameras 12 is two or greater, it is possible to cause the obtained images to be displayed on the screen without combining the images. It may be previously set by, for example, the operator or the like of the construction machine 10 whether it is necessary to combine. A fixed value may be previously set or it may be appropriately set whether it is necessary to combine depending on the contents of the obtained image.

The peripheral image display process combines the obtained multiple images (S03) in a case where it is necessary to combine the images (YES in S02). Further, in a case where it is unnecessary to combine the images (NO in S02) or in a case where the process of S03 is finished, the guideline is generated based on predetermined guideline setup information (S04). The generated guideline is combined with the composite image obtained by the process of S03 or the image just obtained in the process of S01 (S05).

Further, in the peripheral image display process, the combined image is displayed on the display unit 24 such as a monitor (S06). The above-described peripheral image display process is repeatedly performed until an instruction of finishing the peripheral image display process is received by the operator or until the power supply for the construction machine is turned off.

<Exemplary Monitor Screen>

Figure 4A:
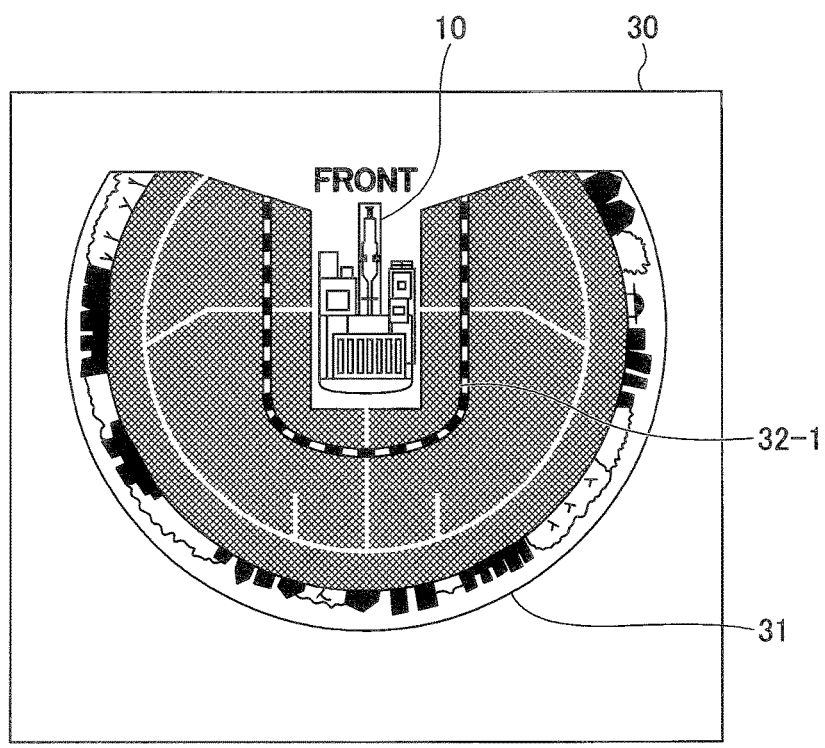
FIG. 4A is an exemplary monitor screen of the one example of the peripheral image display device.
Figure 4B:
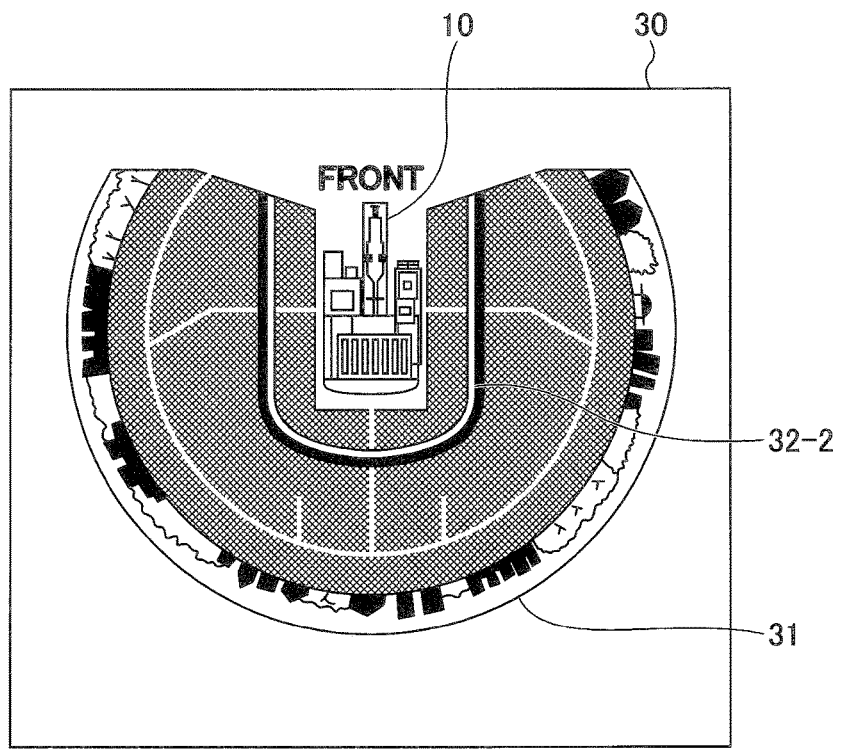
FIG. 4B is another exemplary monitor screen of the one example of the peripheral image display device.

An exemplary monitor screen displayed by the above-described display unit 24 is described with reference to the figures. FIGS. 4A and 4B are exemplary monitor screens of the first example. Corresponding to the type of the construction machine 10, in which the peripheral image display device 20 is installed, a preset image of the construction machine 10, the composite image 31 captured by the cameras 12-1 to 12-3 around the preset image, and a guideline 32 (the guideline 32-1 in FIG. 4A and a guideline 32-2 in FIG. 4B) overlapping the composite image 31 are displayed on the monitor screens illustrated in FIGS. 4A and 4B.

The guideline 32 of the embodiment is provided at a position a predetermined distance apart from the position (an end) of the contour of the construction machine 10. Therefore, within the embodiment, contour shapes are set corresponding to the types and/or the sizes of the construction machines 10. The method of displaying the guideline 32 in the present invention is not specifically limited to the above. For example, the above-described predetermined distance from the position of the contour of the construction machine 10 can be partly adjusted depending on a zone visible from the cockpit 11 and a zone not visible from the cockpit 11.

The monitor screen 30 is specifically described. The guideline 32-1 illustrated in FIG. 4A is a line in which the two colors of black and white are alternately arranged at a predetermined interval, as an example. The interval or the like of the colors alternately arranged is not specifically limited. However, it is preferable that the interval has at least a value enabling the areas of alternately arranged black and white to be distinguished on the screen or greater.

Further, within the embodiment, the guideline is preferably generated such that a ratio between black and white in the entire guideline 32-1 is substantially the same. With this, the operator of the construction machine 10 can view the guideline 32-1 as a black dotted line when the background is bright and can view the same guideline 32-1 as a white dotted line when the background is dark. Meanwhile, the alternately arranged colors are not limited to black and white and may be one color selected from black and white and another color, different two colors other than black and white, and three colors or more selected from all colors.

Further, within the embodiment, the single guideline 32-2 may be generated by arranging two lines having different colors in parallel as illustrated in, for example, FIG. 4B. With this, the dotted lines are not viewed as illustrated in FIG. 4A. Even if the background color is changed, any one of the solid lines can be easily viewed on the screen. In the example of FIG. 4B, the generated guideline has the black line adjacent to the outside of the white line. However, the present invention is not limited to this. The generated guideline may have the white line adjacent to the outside of the black line, or includes multiple white lines and multiple black lines so as to be like a stripe (a stripe pattern).

As described above, within the embodiment, the guideline is generated by alternately arranging two color information having a predetermined width or the guideline generated by adjacently arranging at least two lines having corresponding color information in parallel, and one of the guidelines is combined with the peripheral image. With this, the white line can be identified on a blackish (dark) background, and the white line can be identified on a whitish (bright) background.

Second Example

Because the guideline 32 is overlapped on the image when displayed, there exists a part of the background which is hidden by the guideline and cannot be viewed. Within the present invention, at least one color (for example, white) included in the two color information forming the guideline may be displayed to be translucent and whitish by increasing the luminance of the background color of the original image. Then, the background image under the guideline is not hidden and the visibility of the original image can be improved.

Further, within the present invention, on the contrary to the above, a portion of the black guideline may be displayed to be translucent and blackish by decreasing the luminance of the background color of the original image. Then, the background image under the guideline is not hidden and the visibility of the original image can be improved. As described above, the color information to be made translucent may be one color or multiple colors.

The above content is described below as the second example. FIG. 5 illustrates the second example of a peripheral image display device in a construction machine. In the second example, the same reference symbols as those in the first example are attached to structural elements having a function similar to that of the structural elements of the first example, and detailed description thereof is omitted.

Referring to FIG. 5, the display device 40 includes an image combining unit 21, an image analyzing unit 41, a guideline setting unit 22, a guideline generating unit 42, and a display unit 24.

Within the second example, the image analyzing unit 41 acquires color information for each pixel of the composite image that is obtained by the image combining unit 21. In the example of FIG. 5, luminance is used as an example of the color information. However, the present invention is not limited to this. The color information of an image, which are captured by the cameras 12-1 to 12-3, at a position where the guideline is combined is, for example, color phase, chroma saturation, luminosity, luminance, or the like. Therefore, the guideline generating unit 42 adjusts at least one color information included in the above-described color phase, chroma saturation, luminosity, and luminance to generate the guideline including two color information.

The guideline setting unit 22 sets the resolution of background pixels at a position where the guideline is combined whether how much the resolution is increased (an upper limit value) or how much the resolution is decreased (a lower limit value).

Specifically, the guideline setting unit 22 sets a range of increasing or decreasing the luminance of the pixels, for example. Within the embodiment, a color obtained by increasing its luminance by 50 from the luminance of the background pixels and a color obtained by decreasing its luminance by 100 from the luminance of the background pixels are used, and the upper limit value and the lower limit value are set. The information set as described above is output to the guideline generating unit 42.

The guideline generating unit 42 acquires the luminance of a pixel corresponding to a position (a coordinate) where the guideline is displayed from the color information of the pixel analyzed by the image analyzing unit 41 based on setup information acquired by the guideline setting unit 22, adjusts the luminance to increase or decrease the luminance using the upper limit value and the lower limit value, which are set to the acquired image by the setup information, and generates the guideline by alternately arranging the acquired two colors with a predetermined interval. With this, it is possible to generate the guideline whose background is translucently viewed.

The guideline generating unit 42 outputs the generated image to the display unit 24. Then, the image having the guideline is displayed by the display unit.

As to the above upper and lower limit values, the average luminance of the images captured by the camera 12 may be acquired, and the upper and lower limit values may be set in conformity with the average luminance. Within the second example, it is possible to know brilliance of the periphery of the construction machine 10 by acquiring the average luminance of the pixels of the original image and to generate and display an appropriate guideline in response to this brilliance.

For example, when the average luminance is 80, the periphery of the construction machine 10 is totally dark. Therefore, a line having the upper limit value obtained by adding as +100 (i.e., luminance of 180) and the lower limit value obtained by subtracting as −30 (i.e., luminance of 50) is used. These upper and lower limit values are set using a standard where the jet black has luminance of 0 and the stark white has luminance of 255. Further, within the embodiment, the upper limit value and the lower limit value may have the same absolute value (for example, +50 and −50).

Further, the guideline generating unit 42 can adjust the width of the guideline and/or the length of each color of the colors alternately arranged in the guideline in response to, for example, the average luminance of the image of the periphery, based on the setup information acquired by the guideline setting unit 22.

Figure 6:
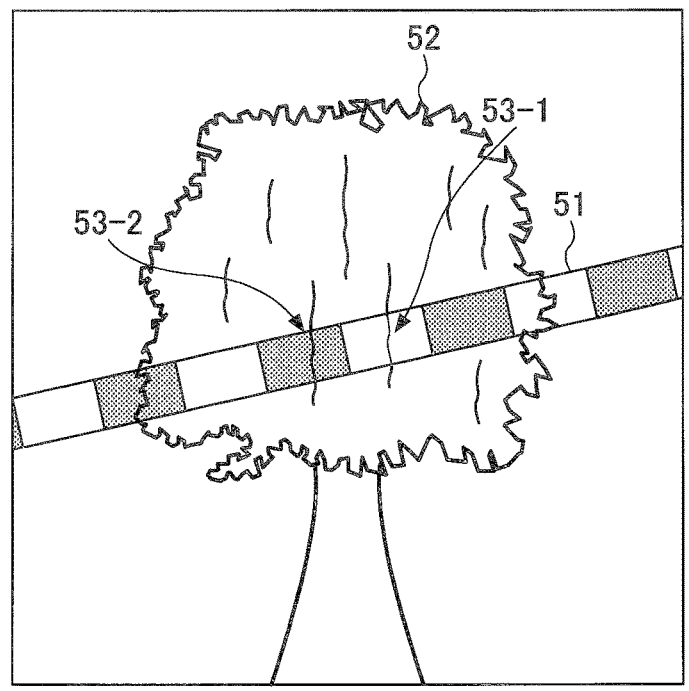
FIG. 6 is an exemplary guideline in another example of the peripheral image display device.

FIG. 6 illustrates an exemplary guideline in the second example. Referring to FIG. 6, a part in the vicinity of the guideline in the screen illustrated in FIG. 4 is enlarged and displayed. Referring to FIG. 6, an example of the guideline where at least two colors are alternately arranged is illustrated. However, the present invention is not limited thereto.

Referring to FIG. 6, in an area 53-1, the luminance is increased from that of the original image in correspondence with the preset upper limit value, and, in an area 53-2, the luminance is decreased from that of the original image in correspondence with the preset lower limit value. As such, because the guideline 51 is displayed to be translucent in FIG. 6, even when there exists an obstacle 52 such as a tree, an operator existing in the periphery, or the like, the obstacle, the operator, or the like are not hidden by the guideline 51 and can be easily observed. The embodiment is not limited to the guideline in which multiple color information are alternately arranged as illustrated in FIG. 6. For example, the guideline may have a stripe pattern generated by arranging multiple color information as describe above.

Third Example

Within a third example, when the above-described illuminance sensor (an illuminance detecting unit) 13 is provided, the brilliance (the illuminance) of the periphery of the construction machine 10 is detected, and the content of the guideline is adjusted corresponding to the detected illuminance.

Figure 7:
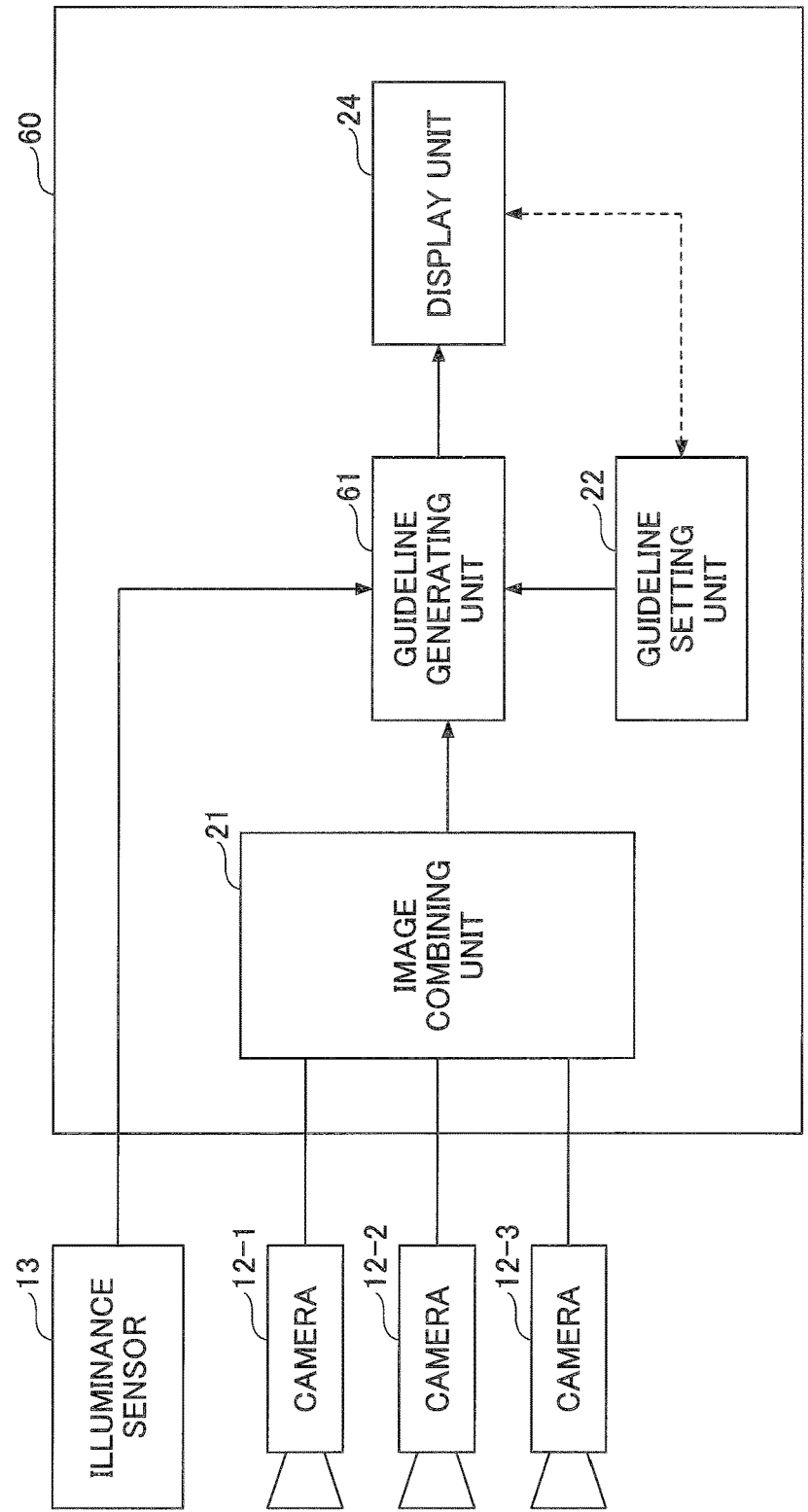
FIG. 7 illustrates a further example of the peripheral image display device in the construction machine.

FIG. 7 illustrates the third example of a peripheral image display device in the construction machine. In the third example, the same reference symbols as those in the first example are attached to structural elements having a function similar to that of the structural elements of the first example, and detailed description thereof is omitted.

A display device 60 illustrated in FIG. 7 is configured to include an image combining unit 21, a guideline setting unit 22, a guideline generating unit 61, and a display unit 24.

Within the third example, the illuminance sensor 13 detects brilliance of various light sources such as an incandescent lamp, a fluorescent lamp, and solar light. In the illuminance sensor 13 of the embodiment, the output value of the luminance sensor 13 relative to the brilliance is similarly reproduced even though the type of the light source is changed. The linearity of the sensor output depending on the value of the illuminance is excellent. Further, the illuminance sensor 13 has a high sensitivity to a received light, and can perform a detection even under low illuminance.

The illuminance sensor 13 outputs the obtained illuminance (brilliance) to the guideline generating unit 61. Further, the guideline setting unit 22 sets whether how much the resolution of the pixel of a part of the background, with which the guideline is combined, is increased (the upper limit value) or how much the resolution of the pixel of the part of the background is decreased (the lower limit value) based on the illuminance acquired by the illuminance sensor 13, in addition to the setup in the first example described above.

Specifically, the guideline setting unit 22 sets a range of increasing or decreasing the luminance of the pixel based on the illuminance acquired by the illuminance sensor 13. For example, when the illuminance is smaller than a predetermined value, the periphery of the construction machine 10 is totally dark. Therefore, a line having the upper limit value obtained by adding as +100 (i.e., luminance of 180) and the lower limit value obtained by subtracting as −30 (i.e., luminance of 50) is used. Further, within the embodiment, the upper limit value and the lower limit value may have the same absolute value (for example, +50 and −50).

Within the third example, the brilliance of the entire screen may be changed in response to the illuminance acquired by the illuminance sensor 13 in addition to the setup of the upper and lower limit values of the guideline described above. Further, in the third example, it is possible to detect the illuminance inside the cockpit 11 by an illuminance sensor provided inside the cockpit, in addition to the illuminance of the periphery of the construction machine 10, and to adjust the upper and lower limit values of the luminance of the guideline or the brilliance of the entire screen in response to the acquired illuminance inside the cockpit 11. The above adjustment can be performed in a process performed by the guideline generating unit 61 or a process performed by the image combining unit 21. When the above process is included in the process performed by the image combining unit 21, the illuminance acquired by the illuminance sensor 13 is output to the image combining unit 21.

Further, the guideline generating unit 61 can adjust the width of the guideline and/or the length of each color of the colors alternately arranged in the guideline in response to, for example the illuminance of the periphery, based on the setup information acquired by the guideline setting unit 22.

Within the third example, it is possible to generate the translucent guideline as illustrated in FIG. 6 by performing the above processes. Said differently, within the third example, even when there exists an obstacle 52 such as a tree, an operator existing in the periphery, or the like, the obstacle, the operator, or the like are not hidden by the guideline 51 and can be easily observed.

Within the embodiment, the first to third examples can be appropriately combined. Further, within the embodiment, the guideline displayed on the screen of the display unit 24 is not limited to 1. For example, multiple guidelines may be displayed on the screen at a predetermined interval from the construction machine 10. Further, a distance from the obstacle, situation of a worksite (ground condition, temperature, daytime, nighttime, or the like), an operation skill of an operator, or the like may be displayed on the screen.

According to the present invention, the guideline displayed together with the peripheral image can be easily recognized even if the construction machinery exists in any environment. Within the present invention, for example, a color approximate to black or white is used. Then, if the camera image is whitish (bright), the guideline can be recognized by the black line, and if the camera image is blackish (dark), the guideline can foe recognized by the white line.

Within the present invention, even when the construction machine exists in any situation, the guideline can be easily observed on the screen. Further, within the present invention, if a person (an operator or the like) who checks a monitor, the guideline is expressed by a contrast difference between black and white can be easily identified.

Within the present invention, at least one color included in at least two color information forming the guideline is displayed to be translucent by increasing the luminance of the background color of the original image. With this, the background image under the guideline is not hidden and the visibility of the original image can be improved.

Although there has been described about the examples of the peripheral image display device and the method of displaying the peripheral image, the present invention is not limited to the above embodiment, and various modifications and changes are possible in the scope of the present invention described in the claims.

According to the present invention, the guideline displayed together with the peripheral image can be easily recognized even if the construction machine exists in any environment.

Explanation of reference symbols is as follows:
10: construction machine
11: cockpit
12: camera (imaging unit)
13: illuminance sensor (illuminance detecting unit)
20, 40, 60: display device
21: image combining unit
22: guideline setting unit
23, 42, 61: guideline generating unit
24: display unit
30: monitor screen
31: composite image
32, 51: guideline
41: image analyzing unit
52: obstacle It should be understood that the invention is not limited to the above-described embodiment, but may be modified into various forms on the basis of the spirit of the invention. Additionally, the modifications are included in the scope of the invention.

What is claimed is:
1. A shovel comprising:
a lower-part travelling body;

an upper-part swiveling body mounted on the lower-part travelling body; and a camera installed in the upper-part swiveling body, the camera capturing an image including an image of a part of the upper-part swiveling body, wherein the camera includes
- a first camera disposed at a back edge between an upper surface of the upper-part swiveling body and a back surface of the upper-part swiveling body without protruding from the back surface to an outside of the upper-part swiveling body, and
- a second camera disposed at a side edge between the upper surface of the upper-part swiveling body and a side surface of the upper-part swiveling body without protruding from the side surface to the outside of the upper-part swiveling body.

2. The shovel according to claim 1,
wherein the second camera is disposed so that an optical axis of the second camera is arranged
in a direction orthogonal to the side surface of the upper-part swiveling body in a plan view of the upper-part swiveling body, or
in a direction turned forward from the direction orthogonal to the side surface.

3. The shovel according to claim 1, the shovel further comprising:
a monitor that displays at least one of
a first image captured by the first camera,
a second image captured by the second camera, and
a combined image obtained by combining the first image and the second image.

4. The shovel according to claim 1,
wherein the first camera is installed in the upper-part swiveling body so as to capture a first image including the image of the part of the upper-part swiveling body, and
wherein the second camera is installed in the upper-part swiveling body so as to capture a second image including the image of the part of the upper-part swiveling body.

5. The shovel according to claim 4,
wherein the first camera is downward inclined toward ground so as to capture the first image including the image of the part of the upper-part swiveling body, and
wherein the second camera is downward inclined toward the ground so as to capture the second image including the image of the part of the upper-part swiveling body.

\* \* \* \* \*